(12) United States Patent
Jeon et al.

(10) Patent No.: US 8,144,114 B2
(45) Date of Patent: Mar. 27, 2012

(54) LIQUID CRYSTAL DISPLAY

(75) Inventors: Jin Jeon, Suwon-si (KR); Kee-Han Uh, Yongin-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 797 days.

(21) Appl. No.: 11/849,848

(22) Filed: Sep. 4, 2007

(65) Prior Publication Data

US 2008/0074567 A1 Mar. 27, 2008

(30) Foreign Application Priority Data

Sep. 26, 2006 (KR) ........................ 10-2006-0093412

(51) Int. Cl.
*G09G 3/36* (2006.01)
(52) U.S. Cl. ...................................................... 345/103
(58) Field of Classification Search .................. 345/103
See application file for complete search history.

(56) References Cited

U.S. PATENT DOCUMENTS

| | | | | |
|---|---|---|---|---|
| 5,151,689 | A * | 9/1992 | Kabuto et al. ................. | 345/103 |
| 7,262,757 | B2 * | 8/2007 | Morita et al. .................. | 345/99 |
| 7,489,326 | B2 * | 2/2009 | Park .............................. | 345/696 |
| 7,710,388 | B2 * | 5/2010 | Hirata et al. .................. | 345/103 |
| 2001/0020929 | A1 * | 9/2001 | Nagata et al. ................. | 345/103 |
| 2002/0044127 | A1 * | 4/2002 | Uchino et al. ................. | 345/98 |
| 2004/0222961 | A1 * | 11/2004 | Lin et al. ....................... | 345/103 |
| 2005/0001803 | A1 * | 1/2005 | Morita et al. .................. | 345/89 |
| 2006/0145991 | A1 * | 7/2006 | Jang et al. ..................... | 345/94 |

FOREIGN PATENT DOCUMENTS

| | | |
|---|---|---|
| CN | 1359097 A | 7/2002 |
| JP | 07-043675 | 2/1995 |
| JP | 2950808 | 7/1999 |
| JP | 2000-258748 | 9/2000 |
| JP | 2002-023712 | 1/2002 |
| JP | 2003-195824 | 7/2003 |
| JP | 2003-255907 | 9/2003 |
| JP | 2005-189758 | 7/2005 |
| JP | 2006-039457 | 2/2006 |
| KR | 1020050077573 | 8/2005 |
| KR | 1020060012801 | 2/2006 |

(Continued)

OTHER PUBLICATIONS

English Abstract for Publication No. 07-043675.

(Continued)

*Primary Examiner* — Amr Awad
*Assistant Examiner* — Stephen Bray
(74) *Attorney, Agent, or Firm* — F. Chau & Associates, LLC (57) ABSTRACT

A liquid crystal display includes a substrate, first and second pixel groups, a first gate line group comprising first gate lines connected to the pixels of the first pixel group, a second gate line group comprising second gate lines connected to the pixels of the second pixel group, a first data line group connected to the pixels of the first pixel group and comprising first data lines extending in a second direction, and a second data line group connected to the pixels of the second pixel group and comprising second data lines extending in the second direction. Each data line of the first data line group and each data line of the second data line group are connected to each other, and the first and second pixel groups are adjacent in the first direction.

17 Claims, 8 Drawing Sheets

FOREIGN PATENT DOCUMENTS

| | | |
|---|---|---|
| KR | 1020060027593 | 3/2006 |
| WO | WO 97/32296 * | 9/1997 |

OTHER PUBLICATIONS

English Abstract for Publication No. 2950808.
English Abstract for Publication No. 2000-258748.
English Abstract for Publication No. 2003-195824.
English Abstract for Publication No. 2003-255907.
English Abstract for Publication No. 2002-023712.
English Abstract for Publication No. 2005-189758.
English Abstract for Publication No. 1020050077575.
English Abstract for Publication No. 1020060012801.
English Abstract for Publication No. 2006-039457.
English Abstract for Publication No. 1020060027563.
English Abstract for Publication No. CN 1359097 A.

* cited by examiner

LIQUID CRYSTAL DISPLAY

CROSS-REFERENCE TO RELATED APPLICATION

This application claims priority to and the benefit of Korean Patent Application No. 10-2006-0093412, filed in the Korean Intellectual Property Office on Sep. 26, 2006, the entire contents of which are incorporated herein by reference.

BACKGROUND OF THE INVENTION (a) Field of the Invention

The present invention relates to a liquid crystal display.

(b) Description of Related Art

Liquid crystal displays (LCDs) are a type of widely used flat panel display. A liquid crystal display includes two display panels each having field-generating electrodes, such as pixel electrodes and a common electrode, and a liquid crystal layer interposed therebetween. The liquid crystal display generates an electric field through a liquid crystal layer by applying a voltage to field generating electrodes, determines the alignment of liquid crystal molecules in the liquid crystal layer therethrough, and controls the polarization of incident light, thereby displaying an image.

The liquid crystal display also includes switching elements connected to pixel electrodes and a plurality of signal lines, such as gate lines and data lines, for supplying voltages to the pixel electrodes. The gate lines transmit gate signals that are generated by a gate driving circuit, and the data lines transmit data voltages that are generated by a data driving circuit. The switching elements transmit the data voltages to the pixel electrodes in accordance with the gate signals.

The gate driving circuit and data driving circuit are directly mounted on a display panel in forms of a plurality of integrated circuit (IC) chips. Alternatively, the gate driving circuit and data driving circuit are mounted on a flexible circuit film and the flexible circuit film is attached on the display panel. Such IC chips are responsible for a large percentage of the manufacturing cost of a liquid crystal display. Moreover, a data driver IC chip is more expensive than a gate driving circuit IC chip. The manufacturing cost of the gate driving circuit can be reduced by integrating the gate driving circuit in the display panel along with the gate lines, the data lines, and the switching elements. However, it is difficult to integrate the data driving circuit in the display panel because the data driving circuit has a complicated structure.

Therefore, a need exists to reduce the number of data driver ICs.

SUMMARY OF THE INVENTION

According to an embodiment of the present invention, a liquid crystal display includes a substrate, first and second pixel groups including a first plurality of pixels arranged in a matrix on the substrate, a first gate line group including a second plurality of gate lines connected to the pixels of the first pixel group and extending in a first direction, and a second gate line group including a plurality of gate lines connected to the pixels of the second pixel group and extending in the first direction, a first data line group connected to the pixels of the first pixel group and comprising a first plurality of data lines extending in a second direction, and a second data line group connected to the pixels of the second pixel group and comprising a second plurality of data lines extending in the second direction, wherein each data line of the first data line group and each data line of the second data line group are connected to each other, and the first and second pixel groups are adjacent in the first direction.

The liquid crystal display may further include a first gate driver connected to the first gate line group and transmitting gate signals to the first gate line group, and a second gate driver connected to the second gate line group and transmitting gate signals to the second gate line group.

Each data line of the first data line group and each data line of the second data line group may be sequentially connected.

Each data line of the first data line group and each data line of the second data line group may be sequentially connected to adjacent data lines.

The liquid crystal display may further include a data driver connected to the first data line group and the second data line group and transmitting data voltages to the first data line group and second data line group.

The data driver may be disposed on a side of the liquid crystal device with respect to the first and second pixel groups.

The data driver may be disposed on a same side of the liquid crystal device with one of the first and second gate driver.

The gate signals may be alternatively and sequentially applied to the first plurality of gate lines of the first gate line group and the second plurality of gate line of the second gate line group.

The first and second gate drivers may be integrated into the substrate.

The first and second gate drivers may be disposed opposite one another with respect to the first and second pixel groups.

The gate signal may include a gate-on voltage Von and a gate-off voltage Voff, and the duration of the gate-on voltage Von may be about 1 H or more.

The duration of the gate-on voltage Von may be about 2 H.

The gate-on voltages Von of the gate signals applied to two gate lines disposed in a same row of the first and second plurality of gate lines of the first and second gate line groups may overlap for a predetermined time.

The predetermined time may be about 1 H.

According to another embodiment of the present invention, a liquid crystal display includes a substrate, first and second pixel groups comprising a plurality of pixels arranged in a matrix on the substrate, a first gate line group comprising a first plurality of gate lines connected to the pixels of the first pixel group and extending in a first direction, and a second gate line group comprising a second plurality of gate lines connected to the pixels of the second pixel group and extending in the first direction. The first and second pixel groups are adjacent in the first direction.

The liquid crystal display may further include a first data line group connected to the pixels of the first pixel group and comprising a first plurality of data lines extending in a second direction, and a second data line group connected to the pixels of the second pixel group and comprising a second plurality of data lines extending in the second direction.

Each data line of the first data line group and each data line of the second data line group may be connected to each other.

Each data line of the first data line group and each data line of the second data line group may be sequentially connected.

The liquid crystal display may further include a data driver disposed on a side of the liquid crystal device with respect to the first and second pixel groups, connected to the first data line group and the second data line group, and transmitting data voltages to the first data line group and second data line group.

The gate signal may include a gate-on voltage Von and a gate-off voltage Voff, and the gate-on voltages Von of the gate signals applied to two gate lines disposed in a same row of the first and second plurality of gate lines of the first and second gate line groups overlap for a predetermined time. The duration of the gate-on voltage Von may be about 2 H.

BRIEF DESCRIPTION OF THE DRAWINGS

Exemplary embodiments of the present invention will be described in detail with reference to the accompanying drawings for clear understanding of the present invention, wherein.

DETAILED DESCRIPTION OF PREFERRED EMBODIMENTS

The present invention will be described more fully hereinafter with reference to the accompanying drawings, in which preferred embodiments of the invention are shown. As those skilled in the art would realize, embodiments may be modified in various different ways, all without departing from the spirit or scope of the disclosure.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

An LCD according to an exemplary embodiment of the present invention will be described in detail with reference to FIGS. 1 to 4.

Figure 1:
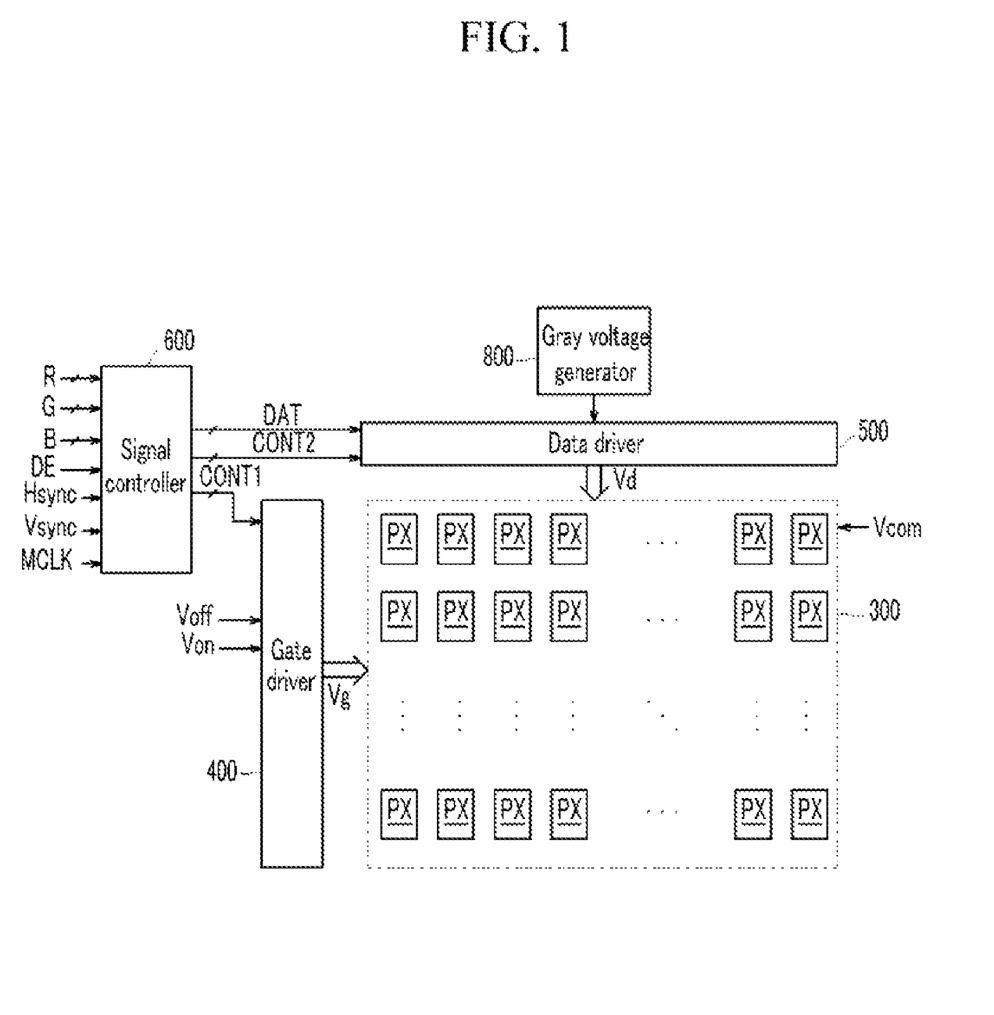
FIG. 1 is a block diagram of an LCD according to an exemplary embodiment of the present invention.
Figure 2:
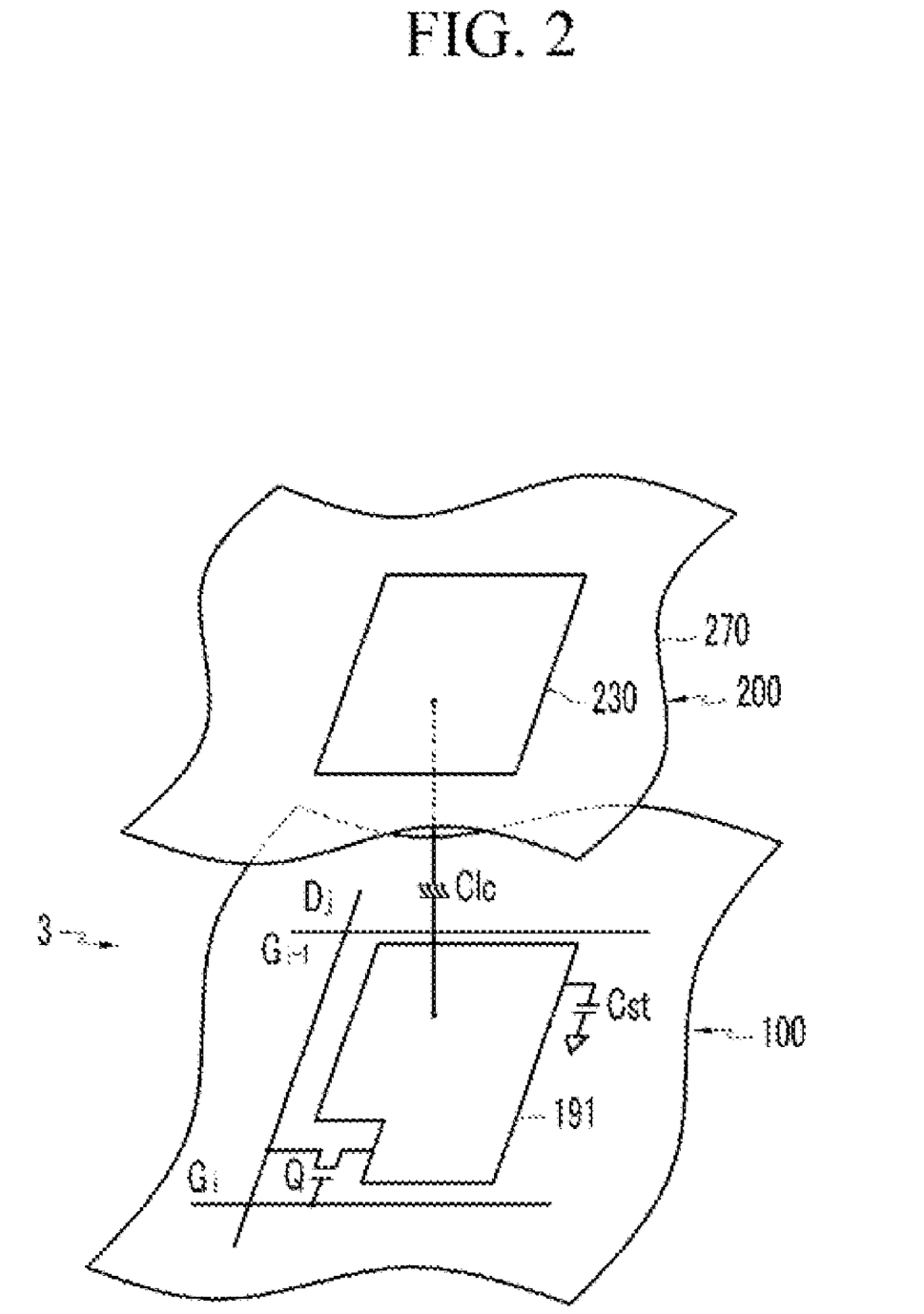
FIG. 2 is an equivalent circuit diagram of a pixel of an LCD according to an exemplary embodiment of the present invention.
Figure 3:
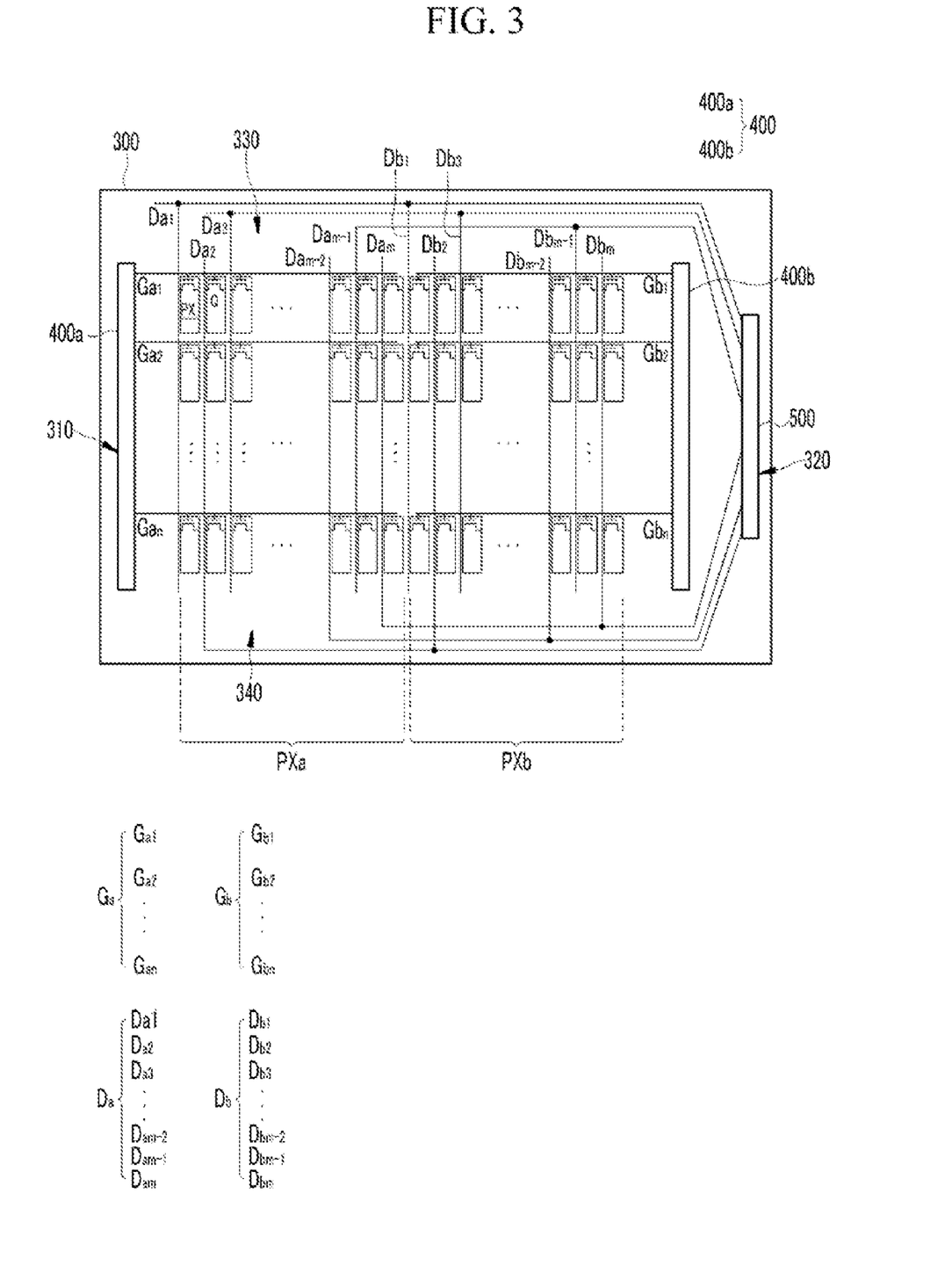
FIG. 3 is a diagram showing an example of a spatial arrangement of pixels, signal lines, and drivers of an LCD according to an exemplary embodiment of the present invention.
Figure 4:
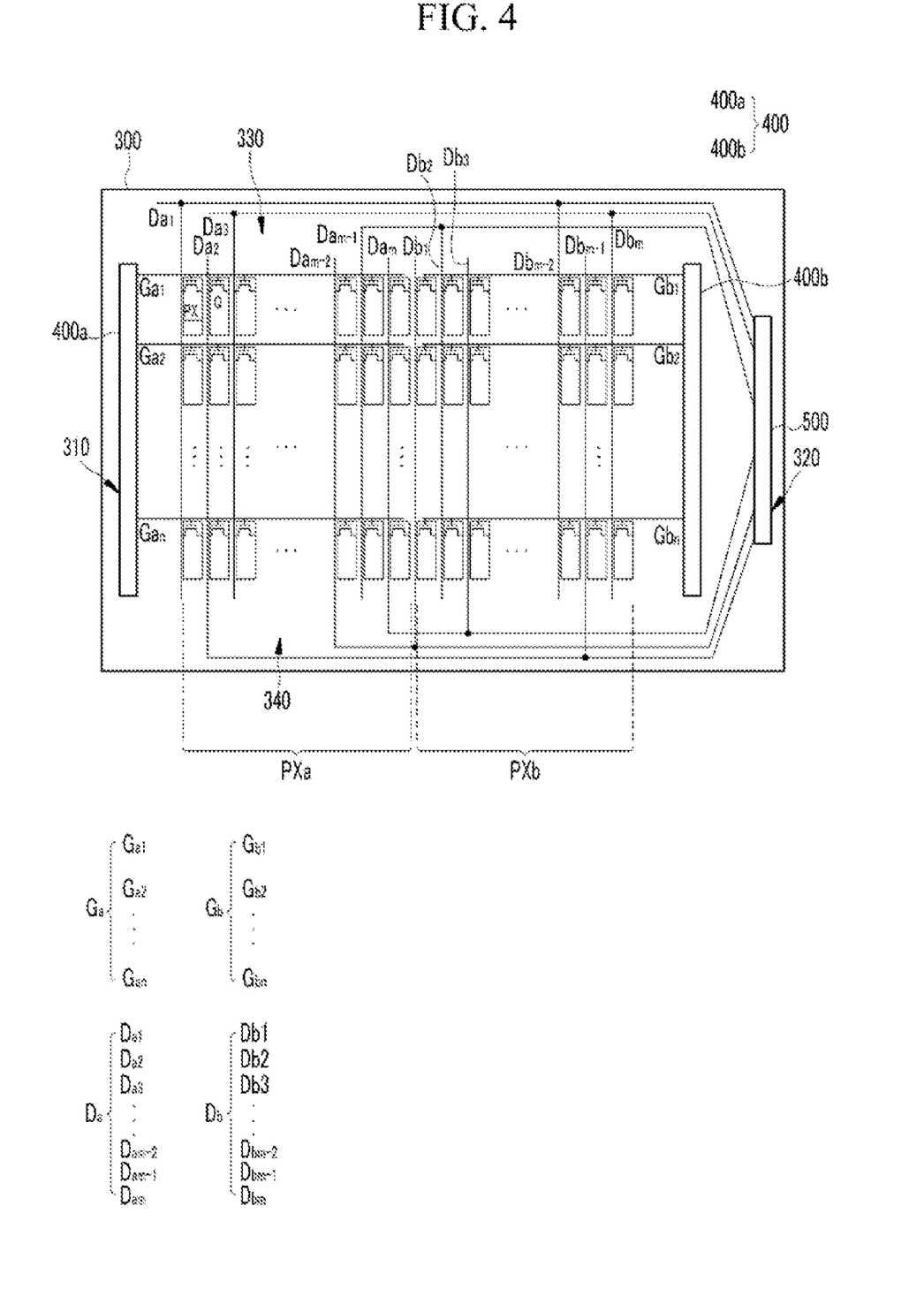
FIG. 4 is a diagram showing another example of a spatial arrangement of pixels, signal lines, and drivers of an LCD according to an exemplary embodiment of the present invention.

FIG. 1 is a block diagram of an LCD according to an exemplary embodiment of the present invention. FIG. 2 is an equivalent circuit diagram of a pixel of an LCD according to an exemplary embodiment of the present invention. FIG. 3 is a diagram showing an example of a spatial arrangement of pixels, signal lines, and drivers of an LCD according to an exemplary embodiment of the present invention. FIG. 4 is a diagram showing another example of a spatial arrangement of pixels, signal lines, and drivers of an LCD according to another exemplary embodiment of the present invention.

Referring to FIGS. 1 and 2, an LCD according to an exemplary embodiment includes a liquid crystal (LC) panel assembly 300, a gate driver 400 and a data driver 500, a gray voltage generator 800, and a signal controller 600. The gate driver 400 and the data driver 500 are coupled with the panel assembly 300. The gray voltage generator 800 is coupled with the data driver 500, and the signal controller 600 controls the gate driver 400 and the data driver 500.

The panel assembly 300 includes a plurality of signal lines $G_{i-1}$, $G_i$, and $D_j$ (i=1, 2, ..., n, and j=1, 2, ..., m) and a plurality of pixels PX connected to the signal lines $G_{i-1}$, $G_i$, and $D_j$ and arranged substantially in a matrix. In the structural view shown in FIG. 2, the panel assembly 300 includes lower and upper panels 100 and 200 facing each other and an LC layer 3 interposed between the panels 100 and 200.

The signal lines $G_{i-1}$, $G_i$, and $D_j$ include a plurality of gate lines $G_{i-1}$, and $G_i$ transmitting gate signals (also referred to as "scanning signals" hereinafter) and a plurality of data lines $D_j$ transmitting data voltages. The gate lines $G_{i-1}$ and $G_i$ extend substantially in a row direction and substantially parallel to each other, while the data lines $D_j$ extend substantially in a column direction and substantially parallel to each other.

Referring to FIG. 2, each pixel PX connected to the gate line $G_i$ and the data line $D_j$ includes a switching element Q connected to the signal lines $G_i$ and $D_j$, and an LC capacitor Clc and a storage capacitor Cst that are connected to the switching element Q. The storage capacitor Cst may be omitted.

The switching element Q is disposed on the lower panel 100 and it has three terminals, including a control terminal connected to the gate line $G_i$, an input terminal connected to the data line $D_j$, and an output terminal connected to the LC capacitor Clc and the storage capacitor Cst.

The LC capacitor Clc includes a pixel electrode 191 disposed on the lower panel 100 and a common electrode 270 disposed on the upper panel 200 as two terminals. The LC layer 3 disposed between the two electrodes 191 and 270 functions as a dielectric of the LC capacitor Clc. The pixel electrode 191 is connected to the switching element Q, and the common electrode 270 is supplied with a common voltage Vcom and covers an entire surface of the upper panel 200. The common electrode 270 may be provided on the lower panel 100, and at least one of the electrodes 191 and 270 may have a shape of a bar or a stripe (not shown).

The storage capacitor Cst is an auxiliary capacitor for the LC capacitor Clc. The storage capacitor Cst includes the pixel electrode 191 and a separate signal line. The separate signal line is provided on the lower panel 100, overlaps the pixel electrode 191 via an insulator, and is supplied with a predetermined voltage such as the common voltage Vcom. Alternatively, the storage capacitor Cst includes the pixel electrode 191 and an adjacent gate line called a previous gate line, which overlaps the pixel electrode 191 via an insulator.

Referring to FIG. 3, the pixels PX are divided into a first pixel group PXa and a second pixel group PXb that are adjacent to each other in a row direction. A plurality of gate lines $G_{a1}$, $G_{a2}$ ... $G_{an}$ and $G_{b1}$, $G_{b2}$ ... $G_{bn}$ are divided into a first gate line group Ga connected to the first pixel group PXa and a second gate line group Gb connected to the second pixel group PXb. The gate lines $G_{a1}/G_{b1}$, $G_{a2}/G_{b2}$ ..., and $G_{an}/G_{bn}$ are arranged in a pixel row and are separated from each other. The gate lines $G_{a1}/G_{b1}$, $G_{a2}/G_{b2}$ ..., and $G_{an}/G_{bn}$ are included in the first and second gate line groups $G_a$ and $G_b$, respectively.

A plurality of data lines are also divided into a first data line group $D_a$ connected to the first pixel group PXa and a second data line group $D_b$ connected to the second pixel group PXb. The data lines $D_{a1}$ and $D_{b1}$, $D_{a2}$ and $D_{b2}$, $D_{a3}$ and $D_{b3}$, ..., $D_{am-2}$ and $D_{bm-2}$ $D_{am-1}$ and $D_{bm-1}$, or $D_{am}$ and $D_{bm}$ of the first and second data line groups $D_a$ and $D_b$ are connected to each other. Extending lines that connect the data lines $D_{a1}$ and $D_{b1}$, $D_{a2}$ and $D_{b2}$, $D_{a3}$ and $D_{b3}$, ..., $D_{am-2}$ and $D_{bm-2}$, $D_{am-1}$ and $D_{bm-1}$, and $D_{am}$ and $D_{bm}$ are alternately disposed on an upper or lower region 330 or 340 of the LC panel assembly 300. The odd numbered data lines $D_{a1}$, $D_{a3}$, ..., $D_{am-1}$, and $D_{b1}$, $D_{b3}$, ..., $D_{bm-1}$ of the first and second data line groups $D_a$ and $D_b$ are connected in the upper region 330 of the LC panel assembly 300 with respect to the pixels PX. The even numbered data lines $D_{a2}$, $D_{a4}$, ..., $D_{am}$, and $D_{b2}$, $D_{b4}$, ..., $D_{bm}$ of the first and second data line groups $D_a$ and $D_b$ are connected in the lower region 340 of the LC panel assembly 300 with respect to the pixels PX.

Alternatively, as show in FIG. 4, the adjacent data lines $D_{am}$ and $D_{b3}$, $D_{am-1}$ and $D_{b2}$, $D_{am-2}$ and $D_{b1}$, ..., $D_{a3}$ and $D_{bm}$, $D_{a2}$ and $D_{bm-1}$, or $D_{a1}$ and $D_{bm-1}$ are connected to each other. A predetermined number of pixels representing different colors, for example three pixels representing each of the primary colors, red, green, and blue, respectively, are defined as one dot. At this time, as shown in FIG. 4, a first dot of the first data line group Da is connected to a final dot of the second data line group Db. A final dot of the first data line group Da is connected to a second dot of the second data line group Db. In two dots connected to each other, data lines connected to each other are connected to pixels representing the same color.

Extending lines that connect the data lines $D_{am}$ and $D_{b3}$, $D_{am-1}$ and $D_{b2}$, $D_{am-2}$ and $D_{b1}$, ..., $D_{a3}$ and $D_{bm}$, $D_{a2}$ and $D_{bm-1}$, and $D_{a1}$ and $D_{bm-1}$ are alternately disposed on an upper or lower region 330 or 340 of the LC panel assembly 300.

For color display, each pixel uniquely represents one of primary colors (i.e., spatial division) or each pixel sequentially represents the primary colors in turn (i.e., temporal division) such that a spatial or temporal sum of the primary colors is recognized as a desired color. An example of a set of the primary colors includes red, green, and blue colors. FIG. 2 shows an example of the spatial division in which each pixel includes a color filter 230 representing one of the primary colors in an area of the upper panel 200 facing the pixel electrode 191. Alternatively, the color filter 230 is provided on or under the pixel electrode 191 on the lower panel 100.

One or more polarizers (not shown) are attached to the panel assembly 300.

Referring to FIGS. 1 and 3 again, the gray voltage generator 800 generates a full number of gray voltages or a limited number of gray voltages (referred to as "reference gray voltages" hereinafter) related to the transmittance of the pixels PX. Some of the (reference) gray voltages have a positive polarity relative to the common voltage Vcom, while the other (reference) gray voltages have a negative polarity relative to the common voltage Vcom.

The gate driver 400 is connected to the gate lines $G_i$ of the panel assembly 300, and synthesizes a gate-on voltage Von and a gate-off voltage Voff to generate the gate signals for application to the gate lines $G_i$.

The gate driver 400 includes first and second gate drivers 400a and 400b that are disposed on the right and left sides of the LC panel assembly 300, respectively. The first gate driver 400a is connected to the first gate line group $G_a$, and the second gate driver 400b is connected to the second gate line group $G_b$. The first and second gate drivers 400a and 400b are disposed opposite each other with respect to the pixels PX, positioned on left and right regions 310 and 320 of the LC panel assembly 300.

The gate drivers 400a and 400b substantially function as shift registers and include a plurality of stages arranged in a line. The gate drivers 400a and 400b may be integrated into the LC panel assembly 300 along with the signal lines $G_{a1}$-$G_{an}$, $G_{b1}$-$G_{bn}$, $D_{a1}$-$D_{am}$, and $D_{b1}$-$D_{bm}$, and the switching elements Q. The gate drivers 400a and 400b may include at least one integrated circuit (IC) chip mounted on the LC panel assembly 300 or on a flexible printed circuit (FPC) film in a tape carrier package (TCP) type, which are attached to the panel assembly 300.

The data driver 500 is connected to the data lines $D_{a1}$-$D_{am}$ and $D_{b1}$-$D_{bm}$ and is disposed on the right region 320 of the LC panel assembly 300 with respect to the pixels PX, adjacent to the second gate driver 400b. The data driver 500 may be positioned near the first gate driver 400a. The data driver 500 applies data voltages, which are selected from the gray voltages supplied from the gray voltage generator 800, to the data lines $D_{a1}$-$D_{am}$ and $D_{b1}$-$D_{bm}$. When the gray voltage generator 800 generates only a few of the reference gray voltages rather than all the gray voltages, the data driver 500 may divide the reference gray voltages to generate the data voltages from among the reference gray voltages.

The signal controller 600 controls the gate driver 400 and the data driver 500, etc.

Each of driving devices 500, 600, and 800 may include at least one integrated circuit (IC) chip mounted on the LC panel assembly 300 or on a flexible printed circuit (FPC) film in a tape carrier package (TCP) type, which are attached to the panel assembly 300. Alternatively, at least one of the driving devices 500, 600, and 800 may be integrated into the panel assembly 300 along with the signal lines $G_{a1}$-$G_{an}$, $G_{b1}$-$G_{bn}$, $D_{a1}$-$D_{am}$, and $D_{b1}$-$D_{bm}$, and the switching elements Q. Alternatively, all the driving devices 500, 600, and 800 may be integrated into a single IC chip, but at least one of the driving devices 500, 600, and 800 or at least one circuit element in at least one of the driving devices 500, 600, and 800 may be disposed outside of the single IC chip.

As described above, by connecting every two data lines of the data lines $D_{a1}$-$D_{am}$ and $D_{b1}$-$D_{bm}$, the number of data driving circuit chips that form the data driver and are mounted on the LCD is reduced. Moreover, since arrangement of the data lines $D_{a1}$-$D_{am}$ and $D_{b1}$-$D_{bm}$ in all the pixels PX are the same, the variation amount of pixel electrode voltages due to parasitic capacitance that occurs between the data lines $D_{a1}$-$D_{am}$ and $D_{b1}$-$D_{bm}$ and the pixel electrodes 191 is uniform. Thus, luminance of each pixel PX is maintained to be uniform. In addition, the difference of the aperture ratio between pixels PX decreases.

The data lines $D_{a1}$-$D_{am}$ and $D_{b1}$-$D_{bm}$ are connected to each other every two data lines, and the number of signal lines connected to the data driver 500 is reduced by half, improving spatial redundancy. Hence, without the spatial limitation, the data driver 500 may be disposed on the side of the LC panel assembly 300.

As described above, the two separated gate lines $G_{a1}$-$G_{an}$ and $G_{b1}$-$G_{bn}$ in each pixel row are connected to the separate gate drivers 400a and 400b. Thereby, even though the two data lines are connected to each other, each pixel row includes one gate line, a reduction of the aperture ratio of the LC panel assembly 300 does not occur.

Now, the operation of the above-described LCD will be described in detail.

The signal controller 600 is supplied with input image signals R, C, and B and input control signals for controlling the display thereof from an external graphics controller (not shown). The input image signals R, G, and B contain luminance information of pixels PX, and the luminance has a predetermined number of grays, for example 1024 ($=2^{10}$), 256 ($=2^8$), or 64 ($=2^6$) grays. The input control signals include a vertical synchronization signal Vsync, a horizontal synchronization signal Hsync, a main clock signal MCLK, and a data enable signal DE.

On the basis of the input control signals and the input image signals R, G, and B, the signal controller 600 generates gate control signals CONT1 and data control signals CONT2 and it processes the image signals R, G, and B to be suitable for the operation of the panel assembly 300 and the data driver 500. The signal controller 600 sends the gate control signals CONT1 to the gate driver 400 and sends the processed image signals DAT and the data control signals CONT2 to the data driver 500.

The gate control signals CONT1 include a scanning start signal STV for instructing the gate driver 400 to start scanning and at least one clock signal for controlling the output period of the gate-on voltage Von. The gate control signals CONT1 may include an output enable signal OE for defining the duration of the gate-on voltage Von.

The data control signals CONT2 include a horizontal synchronization start signal STH for informing the data driver 500 of a start of data transmission for a row of pixels PX, a load signal LOAD for instructing the data driver 500 to apply the data voltages to the data lines $D_{a1}$-$D_{am}$ and $D_{b1}$-$D_{bm}$ and a data clock signal HCLK. The data control signal CONT2 may further include an inversion signal RVS for reversing the polarity of the data voltages (relative to the common voltage Vcom).

Responsive to the data control signals CONT2 from the signal controller 600, the data driver 500 receives a packet of the digital image signals DAT for the row of pixels PX from the signal controller 600, converts the digital image signals DAT into analog data voltages selected from the gray voltages, and applies the analog data voltages to the data lines $D_{a1}$-$D_{am}$ and $D_{b1}$-$D_{bm}$.

The gate driver 400 applies the gate-on voltage Von to a gate line $G_{a1}$-$G_{an}$ and $G_{b1}$-$G_{bn}$ in response to the gate control signals CONT1 from the signal controller 600, thereby turning on the switching transistors Q connected thereto. The data voltages applied to the data lines $D_{a1}$-$D_{am}$ and $D_{b1}$-$D_{bm}$ are supplied to the pixels PX through the activated switching transistors Q. At this time, the gate-on voltage Von is alternately and sequentially applied to the first gate line group $G_a$ and the second gate line group $G_b$, wherein the gate-on voltage Von is applied in the order of the first gate line $G_{a2}$ of the first gate line group $G_a$, the first gate line $G_{b1}$ of the second gate line group $G_b$, the second gate line $G_{a2}$ of the first gate line group $G_a$, the second gate line $G_{b2}$ of the second gate line group $G_b$, etc.

The difference between the voltage of a data voltage and the con-anon voltage Vcom applied to a pixel PX is represented as a voltage across the LC capacitor Clc of the pixel PX, which is referred to as a pixel voltage. The LC molecules in the LC capacitor Clc have orientations depending on the magnitude of the pixel voltage, and the molecular orientations determine the polarization of flight passing through the LC layer 3. The polarizer(s) transmit polarized light such that the pixel PX has a luminance represented by a gray of the data voltage.

By repeating this procedure for each unit of a horizontal period (also referred to as "1 H" and that is equal to one period of the horizontal synchronization signal Hsync and the data enable signal DE), all the gate lines $G_{a1}$-$G_{an}$ and $G_{b1}$-$G_{bn}$ are sequentially supplied with the gate-on voltage Von, thereby applying the data voltages to all pixels PX to display an image for a frame.

When the next frame starts after one frame finishes, the inversion signal RVS applied to the data driver 500 is controlled such that the polarity of the data voltages is reversed (which is referred to as "frame inversion"). The inversion signal RVS may also be controlled such that the polarity of the data voltages flowing in a data line are periodically reversed during one frame (for example row inversion and dot inversion), or the polarity of the data voltages in one packet are reversed (for example column inversion and dot inversion).

A gate driver according to an exemplary embodiment of the present invention will be described with reference to FIGS. 5 to 8.

Figure 5:
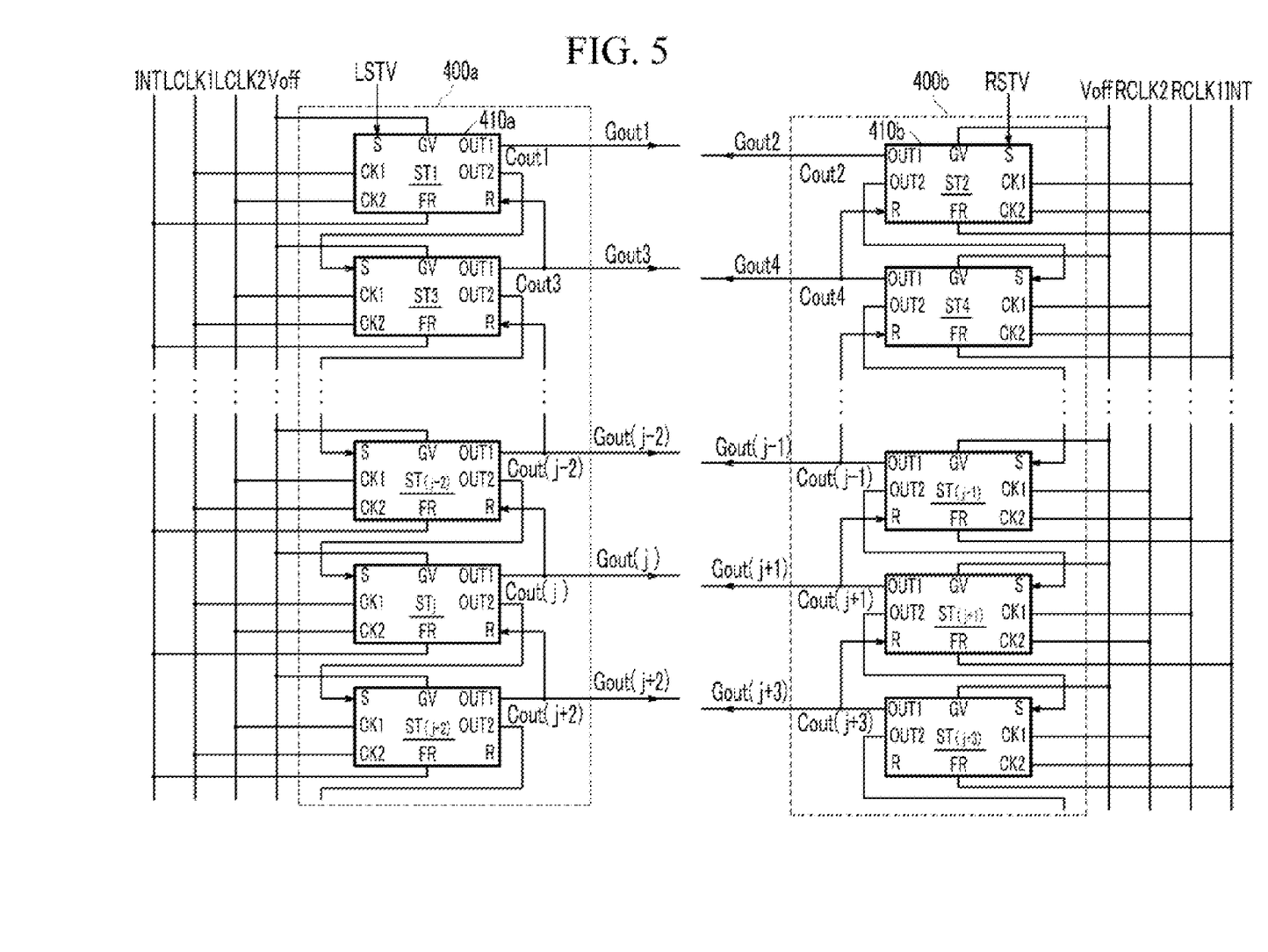
FIG. 5 is a block diagram of a gate driver according to an exemplary embodiment of the present invention.
Figure 6:
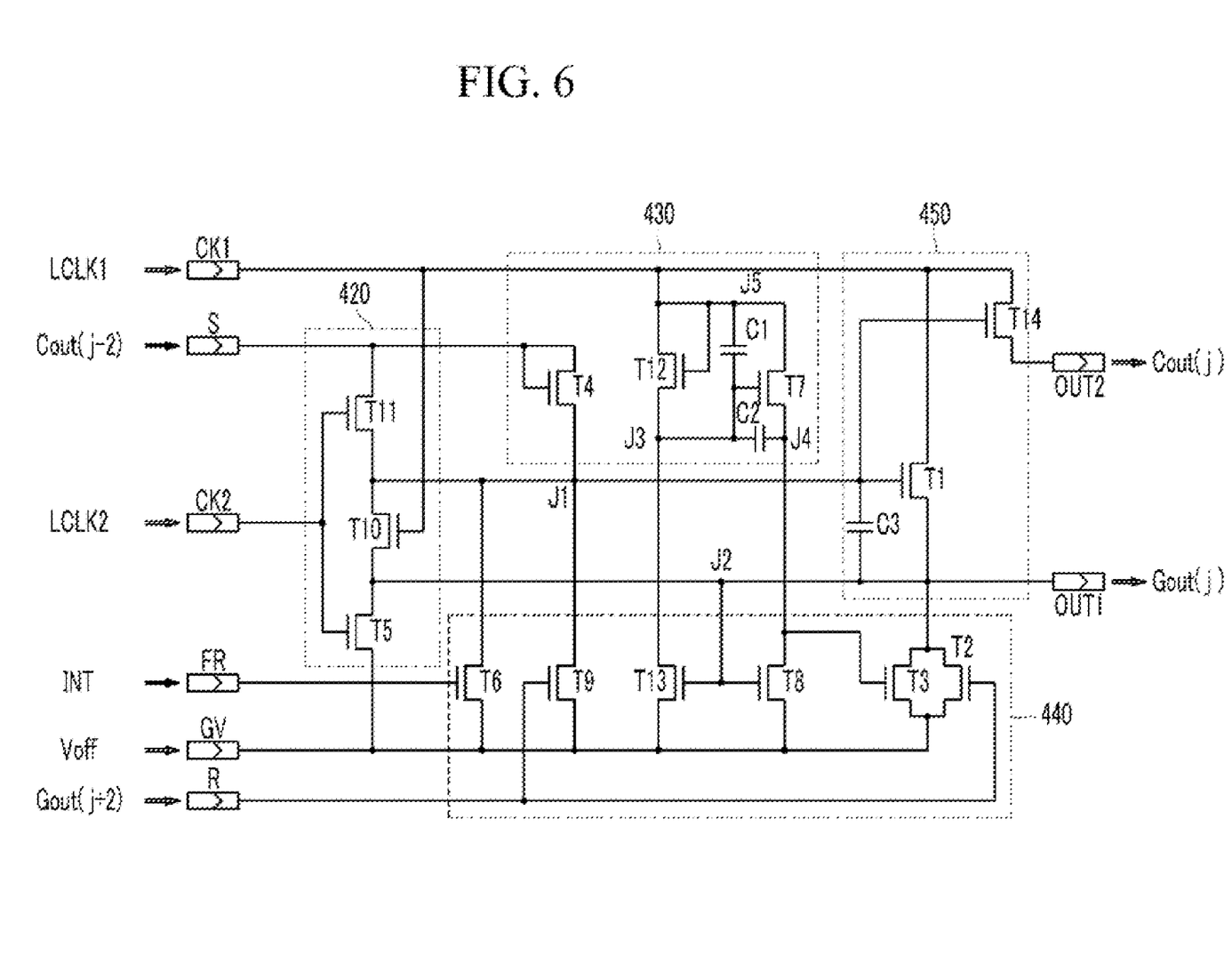
FIG. 6 is an exemplary circuit diagram of a j-th stage of the gate driver shown in FIG. 5.
Figure 7:
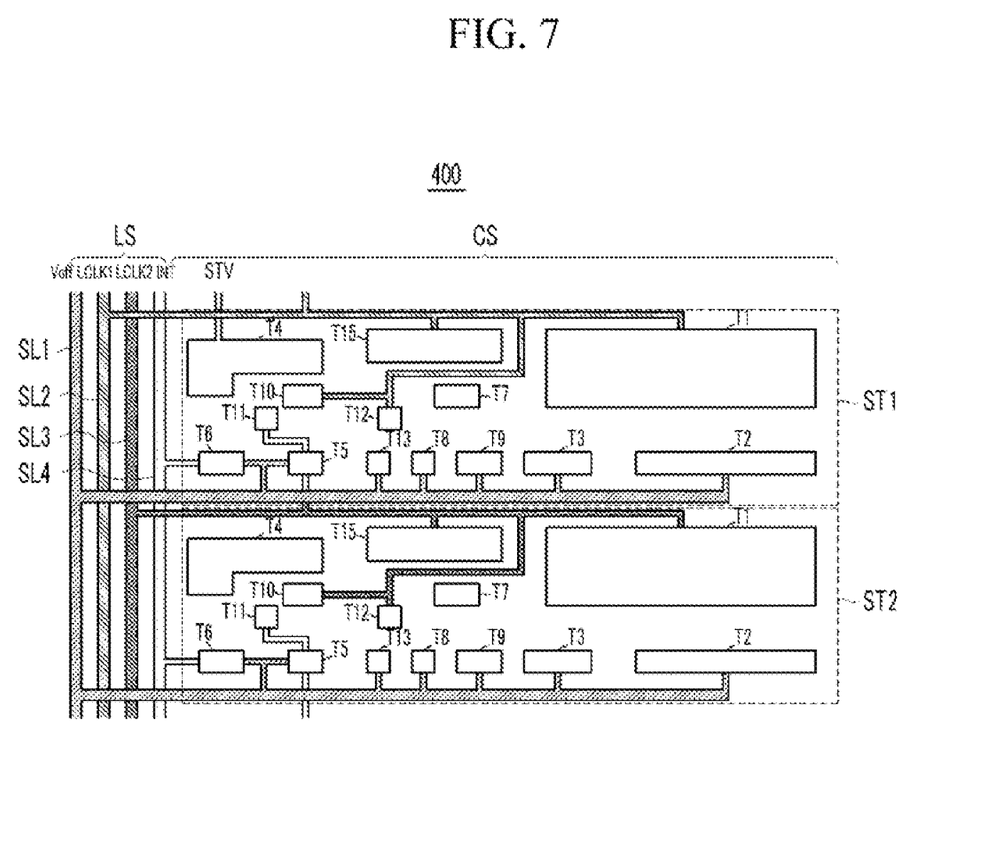
FIG. 7 is a schematic layout view of first and second stages of a gate driver according to an exemplary embodiment of the present invention.
Figure 8:
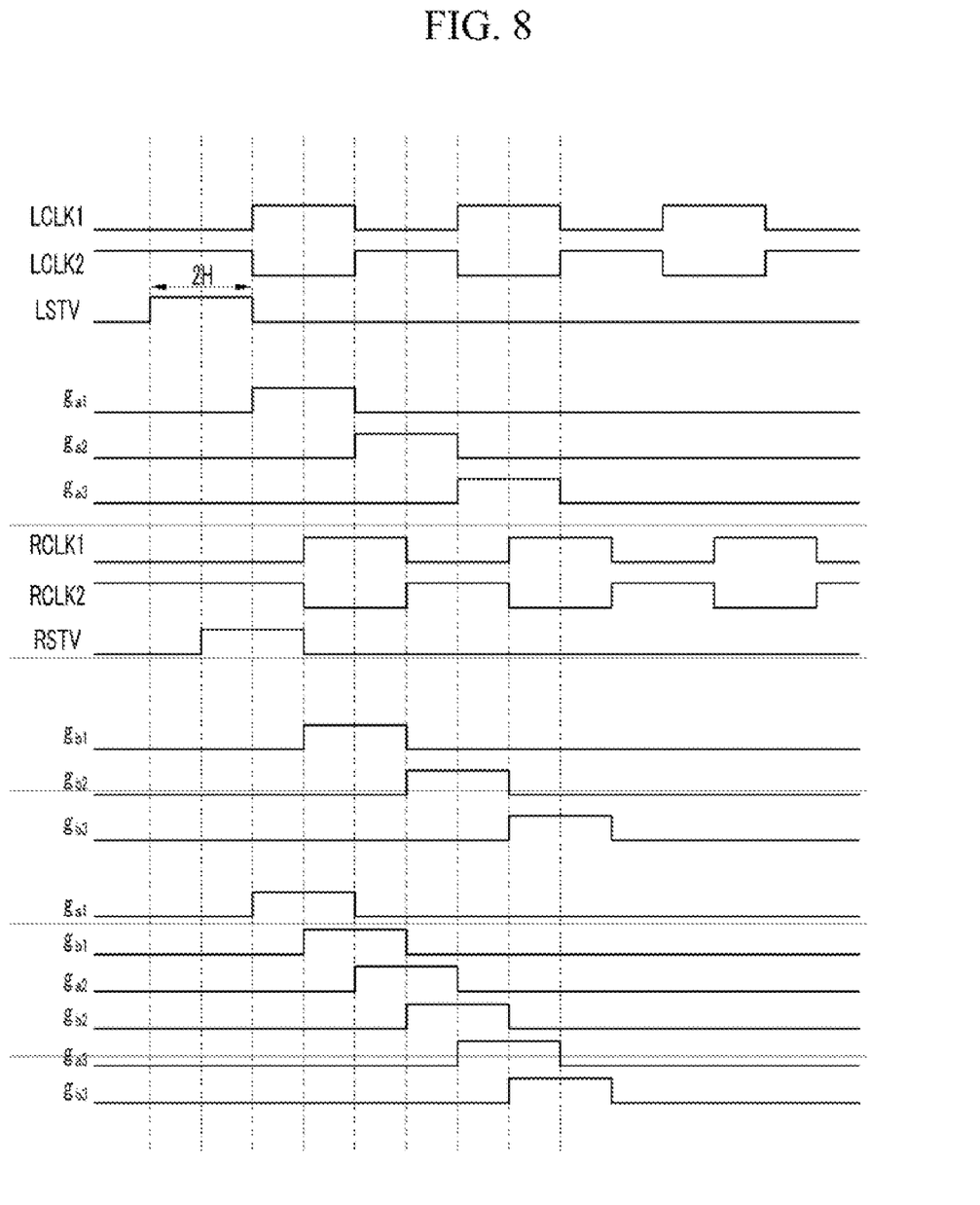
FIG. 8 is a timing diagram of signals of the gate driver shown in FIG. 5.

FIG. 5 is a block diagram of a gate driver according to an exemplary embodiment of the present invention. FIG. 6 is an exemplary circuit diagram of a j-th stage of the gate driver shown in FIG. 5. FIG. 7 is a schematic layout view of first and second stages of a gate driver according to an exemplary embodiment of the present invention. FIG. 8 is a timing diagram of signals of the gate driver shown in FIG. 5.

Referring to FIGS. 5 and 7, the gate drivers 400a and 400b functioning as shift registers are supplied with scanning start signals LSTV and RSTV, and clock signals LCLK1 and LCLK2, and RCLK1 and RCLK2, respectively. Each of the shift registers 400a and 400b includes a plurality of stages 410a or 410b arranged substantially in a line and connected to the gate lines $G_{a1}$-$G_{an}$ or $G_{b1}$-$G_{bn}$.

As shown in FIG. 8, the first scanning start signal LSTV applied to the left shift register 400a and the second scanning start signal RSTV applied to right shift register 400b generate a pulse every frame. The pulse width is about 2 H.

When the first clock signal LCLK1 has a low level, a high level of the first scanning start signal LSTV applied to a first stage 410a of the left shift register 400a is output, and when the first clock signal LCLK1 is changed from the low level to a high level, the first scanning start signal LSTV is changed from the high level to a low level in synchronization with the change of the first scanning start signal LSTV. When the third clock signal RCLK1 has a low level, a high level of the second scanning start signal RSV applied to a first stage 410b of the right shift register 400b is output, and when the third clock signal RCLK1 is changed from the low level to a high level, the second scanning start signal RSTV is changed from the high level to a low level in synchronization with the change of the second scanning start signal RSTV.

Each stage 410a and 410b includes a set terminal S, a gate voltage terminal GV, a pair of clock terminals CK1 and CK2, a reset terminal R, a frame reset terminal FR, a gate output terminal OUT1, and a carry output terminal OUT2.

The clock terminals CK1 and CK2 of two adjacent stages 410a and 410b of each shift register 400a and 400b are supplied with two clock signals LCLK1 and LCLK2 or RCLK1 and RCLK2 that are different from each other. That is, the waveforms of two clock signals LCLK1 and LCLK2 or RCLK1 and RCLK2 are inverted with respect to each other. For example, in the left shift register 400a, the clock terminal CK1 of the first stage 410a is supplied with the first clock signal LCLK1, and the clock terminal CK2 of the first stage 410a is supplied with the second clock signal LCLK2, while the clock terminal CK1 of the second stage 410a is supplied with the first clock signal LCLK2, and the clock terminal CK2 of the second stage 410a is supplied with the second clock signal LCLK1. In the right shift register 400b, the clock terminal CK1 of the first stage 410b is supplied with the third clock signal RCLK1, and the clock terminal CK2 of the first stage 410b is supplied with the fourth clock signal RCLK2, while the clock terminal CK1 of the second stage 410a is supplied with the fourth clock signal RCLK2, and the clock terminal CK2 of the second stage 410b is supplied with the third clock signal RCLK1.

The high level of each clock signal LCLK1, LCLK2, RCLK1, and RCLK2 may be a gate-on voltage Von for turning on the switching elements Q of the pixels PX, and the low level of each clock signal LCLK1, LCLK2, RCLK1, and RCLK2 may be a gate-off voltage Voff for turning off the switching elements Q of the pixels PX.

In each stage, for example in a j-th stage STj, a set terminal S is supplied with a carry output signal Gout(j−2) of a previous stage ST(j−2), a reset R is supplied with a gate output signal Gout(j+2) of a next stage ST(j+2), clock terminals CK1 and CK2 are supplied with the clock signals LCLK1 and LCLK2, respectively, and a gate voltage terminal CV is supplied with a gate-off voltage Voff. A gate output terminal OUT1 of the j-th stage STj outputs a gate output Gout(j), and the carry output terminal OUT2 of the j-th stage STj outputs a carry output signal Cout(j).

A first stage ST1 of each shift register 400a and 400b is supplied with the scanning start signal LSTV and RSTV instead of a previous carry output signal. Moreover, as described above, when the clock terminals CK1 and CK2 of the j-th stage STj are supplied with the clock signal LCLK1 and LCLK2, respectively, the clock terminals CK1 and CK2 of a (j−2)-th stage STj−2 are supplied with the clock signal LCLK2 and LCK1, respectively.

Referring to FIG. 6, each stage of the gate drivers 400a and 400b shown in FIG. 5, for example the j-th stage STj, includes an input unit 420, a pull-up driving unit 430, a pull-down driving unit 440, and an output unit 450. The units 420, 430, 440, and 450 include at least one NMOS transistor T1-T14, and the pull-up driving unit 430 and the output unit 450 further include capacitors C1 and C2, and capacitor C3, respectively. The units 420, 430, 440, and 450 may include at least one PMOS transistor instead of the NMOS transistor. Moreover, the capacitors C1-C3 may be parasitic capacitors formed between the gate terminal and drain/source terminal during manufacturing.

The input unit 420 includes three transistors T11, T10, and T5 connected in series between the set terminal S and the gate voltage terminal CV. Gate terminals of the transistors T11 and T5 are connected to the clock terminal CK2, and a gate terminal of the transistor T10 is connected to the clock terminal CK1. A node of the transistors T11 and T10 is connected to a node J1, and a node of the transistors T10 and T5 is connected to a node J2.

The pull-up driving unit 430 includes three transistors T4, T12, and T7, and two capacitors C1 and C2. The transistor T4 is connected between a set terminal S and the node J1, the transistor T12 is connected to the clock terminal CK1 and a node J3, and the transistor T7 is connected between the clock terminal CK1 and a J4. The transistor includes gate and drain terminals commonly connected to the set terminal S, and a source terminal connected to the node J1. The transistor T12 includes gate and drain terminals commonly connected to the clock terminal CK1, a source terminal connected to the node J3. The transistor T7 includes a gate terminal connected to the node J3 and also connected to the clock terminal CK1 through the capacitor C1, a drain terminal connected to the clock terminal CK1, and a source terminal connected to the node J4. The capacitor C2 is connected between the nodes J3 and J4.

The pull-down driving unit 440 includes a plurality of transistors T6, T9, T13, T8, T3, and T2 that output the gate-off voltage Voff from source terminals thereof to the nodes J1, J2, J3, and J4 through drain terminals thereof. In the transistor T6, a gate terminal is connected to the frame reset terminal FR, and a drain terminal is connected to the node J1. In the transistor T9, a gate terminal is connected to the reset terminal R, and a drain terminal is connected to the node J1. Gate terminals of the transistors T13 and T8 are commonly connected to the node J2, and drain terminals of the transistors T13 and T8 are connected to the nodes J3 and J4, respectively. A gate terminal of the transistor T3 is connected to the node J4, and a gate terminal of the transistor T2 is connected to the reset terminal R. Moreover, drain terminals of the transistors T3 and T2 are connected to the node J2.

The output unit 450 includes a pair of transistors T1 and T14, and the capacitor C3. The transistor T1 includes a drain terminal connected to the clock terminal CK1, a source terminal connected to the output terminal OUT1 and the node J2, and a gate terminal connected to the node J1. The transistor T4 includes a drain terminal connected to the clock terminal CK1, a source terminal connected to the output terminal OUT2, and a gate terminal connected to the node J1. The capacitor C3 is connected between the gate and drain terminals of the transistor T1, that is, the nodes J1 and J2.

Next, the operation of the stage STj will be described.

For better comprehension and ease of description, a voltage corresponding to the high level of the clock signals LCLK1, LCLK2, RCLK1, and RCLK2 is denoted as a high voltage, and a voltage corresponding to the low level of the clock signal LCLK1, LCLK2, RCLK1, and RCLK2 is denoted as a low voltage. The magnitude of the low voltage may be the same as the gate-off voltage Voff.

When the clock signals LCLK2 and the previous carry output signal Cout(j−2) have a high level, the transistors T11, T5, and T4 are turned on. When the transistors T11, T5, and T4 are turned on, the transistors T11 and T4 transmit the high voltage to the node J1, and the transistor T5 transmits the low voltage to the node J2. Hence, the transistors T1 and T14 are turned on to output the clock signal CLK1 through the output terminals OUT1 and OUT2. Since all voltages of the node J2 and the clock signal LCLK1 are the low voltage, the output voltage Gout(j) and Cout(j) become the low voltage. At this time, the capacitor C3 is also charged by a voltage between the high voltage and the low voltage.

At this time, since the clock signal LCLK1 and a next gate output voltage Gout(j+2) are at the low level, and the node J2 is also at the low level, the transistors T10, T9, T12, T13, T8, and T2 having the gate terminals connected to them are turned off.

Subsequently, when the clock signal LCLK2 becomes the low level, the transistors T11 and T5 are turned off. When the clock signal LCLK1 is the high level, an output voltage from the transistor T1 and a voltage of the node J2 become the high voltage. At this time, since the high voltage is applied to the gate terminal of the transistor T10, but the source terminal thereof maintains the high voltage, a voltage difference between the gate and source terminals is substantially 0V, and thereby the transistor T10 maintains the turn-off state. Hence, the node J1 is in a floating state, and thereby the voltage of the node J1 further increases by the high voltage of the capacitor C3.

In the meantime, the potential of the clock signal LCLK1 and the node J2 is the high voltage such that the transistors T12, T13, and T8 are turned on. In this state, the transistors T12 and T13 are connected in series between the high voltage and the low voltage, and thereby the potential of the node J3 has a voltage divided by a value of a resistance state in the turning-on of the transistors T12 and T13. When the value of the resistance state in the turning-on of the transistors T12 and T13 is significantly more than that in the turning-on of the transistor T12, for example the value of the resistance state in the turning-on of the transistors T12 and T13 is about 10,000 times than in the turning-on of the transistor T12, the voltage of the node J3 is almost the same as the high voltage. Accordingly, the transistor T7 is turned on to be connected to the transistor T8 in series, and thereby the node J4 has a voltage divided by a value of a resistance state in the turning-on of the transistors T7 and TB. Since the transistors T7 and T8 are manufactured so that the values of the resistance states of the transistors T7 and T8 are almost the same, the voltage magnitude of the node J4 is a middle value between the high voltage and the low voltage. Accordingly the transistor T3 maintains the turned-off state. The next gate output voltage Gout(j+2) maintains the low voltage, and thereby the transistors T9 and T2 are also turned off. Accordingly, the output terminals OUT1 and OUT2 are connected to the clock signal CLK1 and disconnected from the low voltage, to output the high voltage.

The capacitors C1 and C2 are charged by the voltage difference between both terminals thereof, respectively, and the voltage of the node J3 is less than that of the node J5.

Subsequently, when a next gate output signal Gout(j+1) and the clock signal CLK2 become the high level, and the clock signal CLK1 becomes the low level, the transistors T9 and T2 are turned on to transmit the low voltage to the nodes J1 and J2. At this time, the voltage of the node J1 drops to the low voltage by discharging the capacitor C3. A predetermined time is needed to reach the low voltage due to a discharging time of the capacitor C3. Hence, two transistors T1 and T14 maintain the turned-on state for a predetermined time after the next gate output signal Gout(j+1) is changed to the high level, and thereby the output terminals OUT1 and OUT2 are connected to the clock signal CLK1 to output the low voltage. Next, when the capacitor C3 is completely discharged such that the voltage of the node J1 reaches the low voltage, the transistor T14 is turned off to disconnect the connection of the output terminal OUT2 and the clock signal CLK1. Thereby, the carry output signal Cout(j) becomes in the floating state to output the low voltage. At this time, the output terminal OUT1 is connected to the low voltage through the transistor T2 to output the low voltage even though the transistor T1 maintains the turned-off state.

Meanwhile, the transistors T12 and T13 are turned off, and thereby the node J3 becomes in the floating state. Moreover, the voltage of the node J5 decreases less than that of the node J4. However, the voltage of the node J3 is less than that of the node J5 because of the capacitor C1 such that the transistor T7 is turned off. At this time, the transistor T8 is turned off, and the voltage of the node j4 decreases such that the transistor T3a also maintains the turned-off state. The gate terminal of the transistor T10 is connected to the clock signal CLK1 having the low voltage, and the voltage of the node j2 is the low level. Therefore, the transistor T10 maintains the turned-off state.

Next, when the clock signal CLK1 is changed to the high level, the transistors T12 and T7 are turned on, and the transistor T3 is turned on by voltage increment of the node J4 to transmit the low voltage to the node J2. Thereby, the output terminal OUT1 still outputs the low voltage. Although the output of the next gate output Gout(j+1) is the low level, the node J2 has a low voltage.

Meanwhile, the gate terminal of the transistor T10 is connected to the clock signal CLK1 having the high voltage, and the voltage of the node J2 is the low voltage. Hence, the transistor T10 is turned on to transmit the low voltage of the node J2 to the node J1. The drain terminals of the two transistors T1 and T14 are still connected to the clock terminal CK1 to be supplied with the clock signal CLK1. In particular, the size of the transistor T1 is larger than that of the remaining transistors. Hence, parasitic capacitance between the gate and drain terminal of the transistor T1 increases, and thereby the voltage variation of the drain terminal, may influence the voltage of the gate terminal of the transistor T1. When the clock signal CLK1 is the high level, the voltage of the gate terminal increases due to the parasitic capacitance, and thereby the transistor T1 is turned on. Since the transistor T1 transmits the low voltage of the node 12 to the node J1, the gate terminal of the transistor T1 maintains the low voltage to prevent the turning-on of the transistor T1.

Thereafter, until the previous carry output signal Cout(j−2) is the high level, the voltage of the node J1 maintains the low voltage, the voltage of the node J2 becomes the low voltage through the transistor T3 when the clock signal CLK1 is the high level and the clock signal CLK2 is low level. The voltage of the node J2 becomes the low voltage through the transistor T5 when the clock signal CLK1 is the low level and the clock signal CLK2 is high level.

Meanwhile, the transistor T6 is supplied with an initializing signal INT generated from a dummy stage (not shown), and transmits the gate-off voltage Voff to the node J1, to set the voltage of the node J1 to the low voltage again.

In this manner, the stages 410a and 410b generate carry signals Cout(j) and gate signals Gout(j) based on previous carry signals Cout(j−2)] and next gate signals Gout(j+2)] in synchronization with the clock signals LCLK1 and LCLK2.

As shown in FIG. 8, the first gate signal ga1 applied to the first gate line Ga1 of the first gate line group $G_a$ includes a high level, i.e., a gate-on voltage Von synchronizing the first clock signal LCLK1 based on the first scanning start signal LSTV. The second gate signal $g_{b1}$ applied to the first gate line $G_{b1}$ of the second gate line group $G_b$ includes a high level, i.e., a gate-on voltage Von synchronizing the third clock signal RCLK1 based on the second scanning start signal RSTV. The pulse widths of the gate-on voltage Von of the first and second gate signals $g_{a1}$ and $g_{b1}$ are about 2 H, respectively. For the first half of about 2 H, the corresponding pixels may be precharged, and for the second half of about 2 H, the corresponding pixels may be main-charged by target voltages. The gate-on voltages Von of the first and second gate signals ($g_{a1}$ and $g_{b1}$) overlap for a predetermined time, and the predetermined time may be about 1 H.

Thereafter, the subsequent gate lines $G_{a2}$-$G_{an}$ and $G_{b2}$-$G_{bn}$ of the first and second gate line group $G_a$ and $G_b$ sequentially output the gate-on voltage Von that overlaps a previous gate-on voltage Von for a predetermined time.

According to the present invention, a decrement of aperture ratio of an LCD is substantially prevented, and the number of the data driving chips decreases.

While this invention has been described in connection with what is presently considered to be practical exemplary embodiments, it is to be understood that the invention is not limited to disclosed embodiments, but, on the contrary, is intended to cover various modifications and equivalent arrangements included within the spirit and scope of the disclosure.

What is claimed is:
1. A liquid crystal display comprising:
a substrate;
first and second pixel groups comprising a plurality of pixels arranged in a matrix on the substrate;
a first gate line group comprising a first plurality of gate lines connected to the pixels of the first pixel group and extending in a first direction;
a second gate line group comprising a second plurality of gate lines connected to the pixels of the second pixel group and extending in the first direction;

a first data line group connected to the pixels of the first pixel group and comprising a first plurality of data lines extending in a second direction;

a second data line group connected to the pixels of the second pixel group and comprising a second plurality of data lines extending in the second direction; and a data driver connected to the first data line group and the second data line group, and transmitting data voltages to the first data line group and second data line group, wherein a pair of data lines comprising a data line of the first data line group and a data line of the second data line group are connected to each other, the pair of data lines being connected to the pixels representing the same color, and some data lines of the first data line group and the second data line group receive data voltages from the data driver at a first end, and the other data lines receive data voltages at a second end which is disposed opposite to the first end, and the first and second pixel groups are adjacent in the first direction, wherein a data line closer to a boundary of the first and second data line groups in the first data line group is connected with a data line of the same color closer to the boundary of the first and second data line groups in the second data line group.

2. The liquid crystal display of claim 1, further comprising a first gate driver connected to the first gate line group and transmitting gate signals to the first gate line group, and a second gate driver connected to the second gate line group and transmitting gate signals to the second gate line group.

3. The liquid crystal display of claim 1, wherein each data line of the first data line group and each data line of the second data line group are sequentially connected.

4. The liquid crystal display of claim 1, wherein the data driver is disposed on a side of the liquid crystal display with respect to the first and second pixel groups.

5. The liquid crystal display of claim 2, wherein the data driver is disposed on a side of the liquid crystal display with one of the first gate driver or the second gate driver.

6. The liquid crystal display of claim 1, wherein the gate signals are alternatively and sequentially applied to the first plurality of gate lines of the first gate line group and the second plurality of gate lines of the second gate line group.

7. The liquid crystal display of claim 2, wherein the first and second gate drivers are integrated into the substrate.

8. The liquid crystal display of claim 2, wherein the first and second gate drivers are disposed opposite one another with respect to the first and second pixel groups.

9. The liquid crystal display of claim 1, wherein the gate signal comprises a gate-on voltage Von and a gate-off voltage Voff, and the duration of the gate-on voltage Von is about 1 H or more.

10. The liquid crystal display of claim 9, wherein the duration of the gate-on voltage Von is about 2 H.

11. The liquid crystal display of claim 9, wherein the gate-on voltages Von of the gate signals applied to two gate lines disposed in a same row of the first and second plurality of gate lines of the first and second gate line groups overlap for a predetermined time.

12. The liquid crystal display of claim 11, wherein the predetermined time is about 1 H.

13. The liquid crystal display of claim 1, wherein each data line of the first data line group and each data line of the second data line group are alternately connected from opposite sides of the matrix to adjacent columns of the pixels arranged in the matrix with respect to the first direction.

14. A liquid crystal display comprising:

a substrate;

first and second pixel groups comprising a plurality of pixels arranged in a matrix on the substrate;

a first gate line group comprising a first plurality of gate lines connected to the pixels of the first pixel group and extending in the first direction;

a second gate line group comprising a second plurality of gate lines connected to the pixels of the second pixel group and extending in the first direction;

a first data line group connected to the pixels of the first pixel group and comprising a first plurality of data lines extending in a second direction;

a second data line group connected to the pixels of the second pixel group and comprising a second plurality of data lines extending in the second direction; and a data driver disposed adjacent to one of the first and second pixel groups and on a side of the liquid crystal display in the first direction with respect to the first and second pixel groups, connected to the first data line group and the second data line group, and transmitting data voltages to the first data line group and second data line group, wherein the first and second pixel groups are adjacent in the first direction, a pair of data lines comprising a data line of the first data line group and a data line of the second data line group are connected to each other, the pair of data lines being connected to the pixels representing the same color, and some data lines of the first data line group and the second data line group receive data voltages from the data driver at a first end, and the other data lines receive data voltages at a second end which is disposed opposite to the first end, wherein a data line closer to a boundary of the first and second data line groups in the first data line group is connected with a data line of the same color closer to the boundary of the first and second data line groups in the second data line group.

15. The liquid crystal display of claim 14, wherein each data line of the first data line group and each data line of the second data line group are connected to each other.

16. The liquid crystal display of claim 15, wherein each data line of the first data line group and each data line of the second data line group are sequentially connected.

17. The liquid crystal display of claim 14, wherein the gate signal comprises a gate-on voltage Von and a gate-off voltage Voff, and the gate-on voltages Von of the gate signals applied to two gate lines disposed in a same row of the first and second plurality of gate lines of the first and second gate line groups overlap for a predetermined time, wherein the duration of the gate-on voltage Von is about 2 H.

* * * * *